Oct. 21, 1958     S. PACHERNEGG     2,857,218
PISTON FOR INTERNAL COMBUSTION ENGINES
Filed March 16, 1956
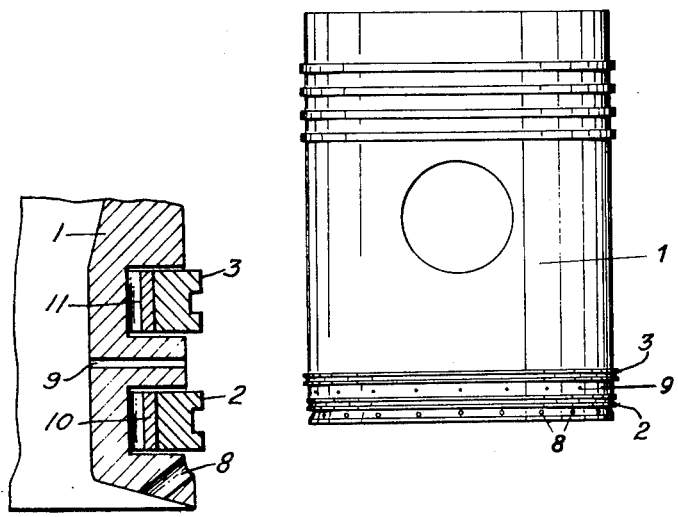
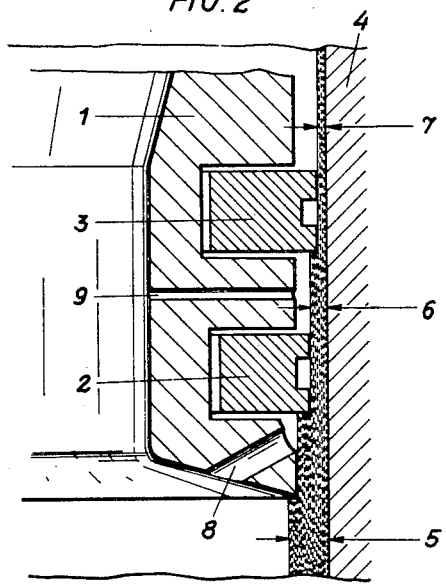

United States Patent Office 2,857,218
Patented Oct. 21, 1958

2,857,218

PISTON FOR INTERNAL COMBUSTION ENGINES

Siegfried Pachernegg, Graz, Austria, assignor to Gustav Ospelt, Vaduz, Liechtenstein Application March 16, 1956, Serial No. 572,100

Claims priority, application Austria March 25, 1955

11 Claims. (Cl. 309—7)

It is a well-known fact that the amount of lubricating oil reaching the combustion chamber has a decisive influence on the lubricating oil consumption of the engine. Therefore, the greatest importance should be attached to the process of oil wiping by means of the oil scraper rings of the piston. The oil film to be wiped off the working surfaces of the cylinder averages several hundredths of a millimeter, whereas the oil film that keeps the oil consumption within reasonable limits is of the order of 0.001 millimeter or even less. The removal of such thin films from the cylinder wall will produce substantial viscosity and shearing stresses naturally dependent, among other factors, upon the initial and final thicknesses of the lubricating film.

For the removal of a determined thickness of film a certain radially directed constant pressure of the oil scraper ring is also required. The same is known to be produced firstly by designing the oil scraper ring of a somewhat larger outside diameter than the inside diameter of the cylinder. Secondly, the oil scraper ring is slotted radially and inserted in the cylinder after compression accompanied by a narrowing of the radial slot. The ring sliding in the cylinder has the tendency to expand, thereby producing the above-mentioned radial pressure on the cylinder wall. According to standards, the measure for the radial pressure thus produced is said to be the tangential force as a function of the cylinder diameter at the closing of the ring slot. If the width of the ring remains unchanged, the tangential force is proportional to the ring diameter, if the radial pressure is to be constant for all cylinder diameters.

For the removal of a certain thickness of film a certain tangential force of the oil scraper ring is required. To obtain the desired thinness of the oil film this force would have to be extremely great if the whole film were to be removed by a single ring. When using two oil scraper rings located one behind the other and both of approximately the same tangential force, the remaining oil film will be thinner than it would be if only a single oil scraper ring were used, but the effectiveness of the second upper oil scraper ring is comparatively small. Consequently, the tangential forces of both rings will have to be relatively great with the resulting increase in effort required for oil scraping. If the oil return sections between the two oil scraper rings are too amply dimensioned, this fact is liable to result not only in ineffectiveness of the second oil scraper ring but even to produce the opposite effect inasmuch as oil might be allowed to enter through this ring.

In order to avoid these difficulties it is proposed according to the invention to stretch the inserted upper ring much tighter than the lower ring. The slightly stretched lower ring admits a sufficient amount of oil for the lubrication of the piston skirt, whereas the tightly stretched upper ring controls consumption by ensuring the required thinness of the oil film. In that case, the effort needed for oil scraping is considerably less than it would be if two identical, tightly stretched rings were used.

Preferably the stretching of the upper ring is so much tighter than that of the lower ring that the tangential force of the former will exceed that of the latter by about 3.5 to 10 kilograms relative to 100 mm. cylinder diameter. The additional tangential force of the upper ring can be achieved according to the invention by increasing the wall thickness of said ring or by the use of supporting springs in conjunction with said ring.

In port-controlled two-stroke internal combustion engines the two oil scraper rings are preferably located in a manner known per se at the lower edge of the piston. The oil return bores between the two oil scraper rings are designed as small as possible in view of the small but critical amount of oil to be removed at this point, so as to provide a pressure drop of the wiped-off oil in the direction of the interior of the piston and/or to eliminate any reversal of lubrication by the delivery of spray oil to the working surfaces between the oil rings. According to a feature of the invention, the overall section of the return bores between the two oil scraper rings is smaller than 30 sq. millimeters relative to 100 mm. cylinder diameter. If the cylinder diameter is larger or smaller, the entire return section will be proportionately larger or smaller.

In the drawing the subject-matter of the invention is illustrated with reference to an example. Figure 1 is an elevation of the piston. Figure 2 shows diagrammatically a section of the lower portion of the piston of a two-stroke internal combustion engine inserted in the cylinder, the thickness of the oil film being greatly exaggerated for better demonstration.

Figure 3 is a fragmentary sectional view corresponding generally to Figure 2 but omitting the cylinder structure and showing a slightly modified form of the invention.

In the piston 1 two oil scraper rings 2 and 3 are inserted in the proximity of its lower edge, the oil scraper ring 2 being of smaller height and consequently, presenting lesser tangential forces than the oil scraper ring 3. The oil scraping process is accomplished during the downward stroke of the piston. The oil film on the cylinder wall 4 in thickness 5 is first reduced to the lesser thickness 6 by means of the oil scraper ring 2. The thickness of the oil film 5 can practically amount from several hundredths to one tenth of a millimeter. By means of the oil scraper ring 2 this oil film is reduced to about 0.01 mm. The oil film thickness 7 of about 0.001 mm. desired to keep the oil consumption of the engine within reasonable limits is attained by means of the second oil scraper ring 3. Each of the two oil scraper rings thus reduces the thickness of the oil film to about one tenth of the previous amount. Therefore, the ring 2 removes a substantially larger quantity of oil than the ring 3. The return bores 8 of the ring 2 are therefore, of a considerably larger section than the return bores 9 of the ring 3. The return bores 9 should be just large enough to permit the oil wiped off by the ring 3 to flow off into the interior of the piston. If these sections are too large, a return of the oil is liable to occur, resulting in an undesirable increase in thickness of the oil film 7 passing into the combustion chamber.

Rather than rely solely on the inherent resiliency of the piston rings 2 and 3 for exerting the varying radial pressures against the cylinder walls as aforementioned, there may be employed suitable spring means for this same purpose in conjunction with each of the piston rings. As is illustrated in Figure 3 such spring means may be of conventional type including the spring 10 interposed between the piston ring 2 and the bottom of the groove in piston 1 in which said ring is seated and the spring 11 interposed between the inner portion of the piston ring 3 and the groove in which the latter is seated. In order to thrust the ring 3 outwardly with a greater force than that exerted by the spring 10 it will be seen that the spring 11 may readily be of greater cross-sectional area and therefore of greater strength than the spring 10, although it will be understood that the particular manner by which the different strengths is attained is not of the essence of the present invention but this may be accomplished in various manners well known in the art. Moreover the springs 10 and 11 may assume various conventional forms. In the present modification of Figure 3 these are shown as representing conventional springs of generally annular shape but of serpentine configuration in a radial plane whereby the peaks or nodes of the respective convolutions abut alternately against the particular piston ring 2 or 3 and the bottom of the piston groove with which it is associated and thereby exert a radial outer thrust against the ring.

I claim:

1. The combination, with a piston of internal combustion engines, of two oil scraper rings of the slotted type shrunk in said piston, the oil scraper ring more distant from the open end of the piston being, when inserted in the cylinder, considerably tighter stretched in a radial direction than the oil scraper ring closer to the open end of said piston.

2. The combination, with a piston of internal combustion engines, of two oil scraper rings of the slotted type shrunk in said piston, the oil scraper ring more distant from the open end of said piston presenting, when inserted in the cylinder, and relative to 100 mm. cylinder diameter, a tangential force exceeding that of the oil scraper ring closer to the open end of said piston, by about 3.5 to 10 kilograms.

3. The combination, with a piston of internal combustion engines, of two oil scraper rings of the slotted type shrunk in said piston, the oil scraper ring more distant from the open end of the piston being, when inserted in the cylinder, considerably tighter stretched than the oil scraper ring closer to the open end of said piston, the greater tangential force of the tighter stretched ring being achieved by a greater wall thickness of said ring.

4. The combination, with a piston of internal combustion engines, of two oil scraper rings of the slotted type shrunk in said piston, the oil scraper ring more distant from the open end of the piston being, when inserted in the cylinder, considerably tighter stretched in a radial direction than the oil scraper ring closer to the open end of said piston, the greater tangential force of the tighter stretched ring being achieved by the use of supporting springs.

5. The combination, with a piston of internal combustion engines, of two oil scraper rings of the slotted type shrunk in said piston, the oil scraper ring more distant from the open end of said piston being, when inserted in the cylinder, considerably tighter stretched in a radial direction than the oil scraper ring closer to the open end of said piston, both oil scraper rings being located in the vicinity of the open end of the said piston.

6. The combination, with a piston of internal combustion engines, of two oil scraper rings of the slotted type shrunk in said piston, the oil scraper ring more distant from the open end of said piston being, when inserted in the cylinder, considerably tighter stretched in a radial direction than the oil scraper ring closer to the open end of said piston, the said piston having oil return bores between the oil scraper rings for the discharge of oil into the interior of the piston, the total section of said bores being less than 30 square millimeters relative to 100 millimeters of cylinder diameter.

7. A cylindrical piston for use in the cylinder of an internal combustion engine, comprising a pair of relatively axially spaced radially compressible oil scraper rings operatively disposed on said piston, means operatively associated with the respective rings for resiliently resisting radial compression thereof with different forces, the said ring closer to the open end of the piston having the weaker said means associated therewith.

8. The combination comprising a cylinder, a cylindrical piston axially reciprocable therein, a pair of relatively axially spaced piston rings on said piston, means resiliently expanding each of said rings radially toward the inner wall of said cylinder, one of said means being stronger and exerting a greater radial force than the other, whereby said rings will project radially to different depths into a lubricating oil film on said inner wall to successively wipe away different strata of oil in one direction of reciprocation of the piston.

9. The combination of claim 8 wherein said piston is formed with one open end and with an oil drainage passage establishing communication between the interior of said piston and the exterior of said piston between said rings.

10. The combination of claim 8 wherein said resilient means comprises stiffly resiliently radially deflectible material forming the respective rings, said one means being stiffer than the other said means.

11. The combination of claim 8 wherein said resilient means comprises spring means interposed between said cylinder and the respective rings.

References Cited in the file of this patent
UNITED STATES PATENTS

| | | |
|---|---|---|
| 2,064,969 | Carr et al. | Dec. 22, 1936 |
| 2,379,359 | Kettering | June 26, 1945 |